US007946119B2

(12) United States Patent
Geary

(10) Patent No.: US 7,946,119 B2
(45) Date of Patent: May 24, 2011

(54) SEALING ARRANGEMENT

(75) Inventor: Alan Philip Geary, Bristol (GB)

(73) Assignee: Rolls-Royce PLC, London (GB)

( * ) Notice: Subject to any disclaimer, the term of this patent is extended or adjusted under 35 U.S.C. 154(b) by 972 days.

(21) Appl. No.: 11/585,119

(22) Filed: Oct. 24, 2006

(65) Prior Publication Data

US 2007/0128002 A1 Jun. 7, 2007

(30) Foreign Application Priority Data

Nov. 15, 2005 (GB) .................................. 0523198.0

(51) Int. Cl.
*F02C 7/20* (2006.01)

(52) U.S. Cl. ................ 60/796; 60/798; 60/800; 60/752; 60/39.827; 277/644; 277/628

(58) Field of Classification Search .................... 60/769, 60/798, 800, 752, 39.827, 796; 277/644, 277/628

See application file for complete search history.

(56) References Cited

U.S. PATENT DOCUMENTS

| | | | | | |
|---|---|---|---|---|---|
| 3,911,672 | A | * | 10/1975 | Irwin | 60/796 |
| 4,903,476 | A | * | 2/1990 | Steber et al. | 60/800 |
| 5,579,645 | A | * | 12/1996 | Prociw et al. | 60/740 |
| 6,442,929 | B1 | * | 9/2002 | Kraft et al. | 60/39.827 |

FOREIGN PATENT DOCUMENTS

| | | | |
|---|---|---|---|
| EP | 1 424 469 | A2 | 6/2004 |
| GB | 2 062 958 | A | 5/1981 |
| GB | 2 184 156 | A | 6/1987 |
| GB | 2 217 399 | A | 10/1989 |

* cited by examiner

*Primary Examiner* — Michael Cuff
*Assistant Examiner* — Craig Kim
(74) *Attorney, Agent, or Firm* — Oliff & Berridge, PLC

(57) ABSTRACT

An arrangement for sealing an opening formed in a wall for receiving a member. The arrangement comprises a sealing member with a passage, and the sealing member is moveably mounted on the wall adjacent to the opening such that the sealing member passage is substantially co-axial with the opening in the wall. Biasing means for biasing the sealing member towards the wall are also provided.

13 Claims, 2 Drawing Sheets

SEALING ARRANGEMENT

The invention relates to an arrangement for sealing.

In particular the invention relates to an arrangement for sealing an aperture formed in a wall for receiving a member.

Frequently it is required to insert a device through the wall of another device to fulfil a function. For example, it is common for combustion chambers of gas turbine engines to be fitted with fuel ignition devices which are mounted such that they can extend through the wall of the combustor. In some gas turbine engines a spark ignition device extends from the outside of an engine casing, through a combustor annulus and an opening formed in a wall of the combustor to present the tip of the ignition device to the fuel-air mixture in the combustor. Air is passed along the combustor annulus to cool the combustor wall and for delivery through a plurality of dilution holes in combustor wall to aid combustion. The opening for the igniter is substantially larger than the barrel of the ignition device to allow for a small amount of misalignment during engine build and for relative movement between the igniter and the combustor during operation. Since air will pass through the igniter aperture and affect the spark kernel formed, thereby inhibiting ignition, it is advantageous to keep the opening in the combustor as small as possible, but this increases the likelihood of the edge of the aperture fretting on the side of the igniter, wearing both components and reducing their operational life.

A solution to this problem is the provision of a sealing member, in the form of a grommet on the combustor wall, which spans the opening in the combustor wall and seals around the igniter. A passage through the sealing member has a diameter only slightly larger than the diameter of the portion of the igniter passing through it to restrict air leakage through the passage. The grommet is loosely mounted to the combustor such that, while it is fixed to the combustor, small relative movements are possible to accommodate relative movement between the combustor and the igniter and build misalignment. However, the range of movement of the sealing member/grommet is limited such that the igniter is prevented from contacting the edge of the opening in the combustor, thereby preventing the igniter from fretting on the combustor wall.

In such a configuration the sealing member/grommet may be excited by operational vibration of the combustor that will lead to the contact points on the sealing member/grommet and igniter fretting, hence resulting in premature rejection and/or failure of the igniter.

Therefore a means for fitting an igniter or some such accessory through a combustor wall, which both seals air gaps and damps vibration, is highly desirable.

According to the present invention there is provided an arrangement for sealing an opening formed in a wall for receiving a member, the arrangement comprising a sealing member with a passage, whereby the sealing member is moveably mounted on the wall adjacent to the opening such that the sealing member passage is substantially co-axial with the opening in the wall, and biasing means for biasing the sealing member towards the wall.

The invention solves the problem of the prior art by providing a means for sealing around a component entered in a wall of another component which will also damp vibration induced by the operation of one or other or both components, thereby increasing the operational life of both the components.

Preferably the biasing means comprises at least one resilient member. That is to say, the means for biasing the sealing member towards the wall is a spring or the like.

Preferably the sealing member comprises a flange which is engaged by the biasing means. That is to say, the sealing member is provided with a surface formation such that the biasing means can maintain contact with the sealing member thus enabling it to bias the sealing member towards and against the wall.

Preferably the biasing means extends across and/or around at least part of the sealing member. That is to say, the biasing means is in contact with at least some of the sealing member, thus enabling is to exert force on the sealing member to bias it towards and against the wall.

Preferably the biasing means substantially conforms to at least part of the shape of the sealing member. Small clearances between features of the biasing means and sealing member provides a means of self alignment during assembly and location in operation.

Preferably the sealing member is mounted on the wall by at least one pin which extends through a corresponding mounting aperture in the sealing member, the mounting aperture having a diameter larger than the diameter of the at least one pin such that the sealing member is moveable relative to the wall. Hence misalignments between external mounting of the member to be installed and the wall to which the sealing member is mounted can be accommodated as the sealing member can move slightly to accept the member in its passage.

Preferably the arrangement further comprises at least one bracket attached to the wall which extends over at least part of the biasing means, thereby trapping the biasing means between the at least one bracket and the flange. The bracket provides a surface for the resilient member to react against such that the resilient member can bias the sealing member towards and against the wall.

The invention will now be described by way of example only, with reference to the accompanying drawings in which.

Figure 1:
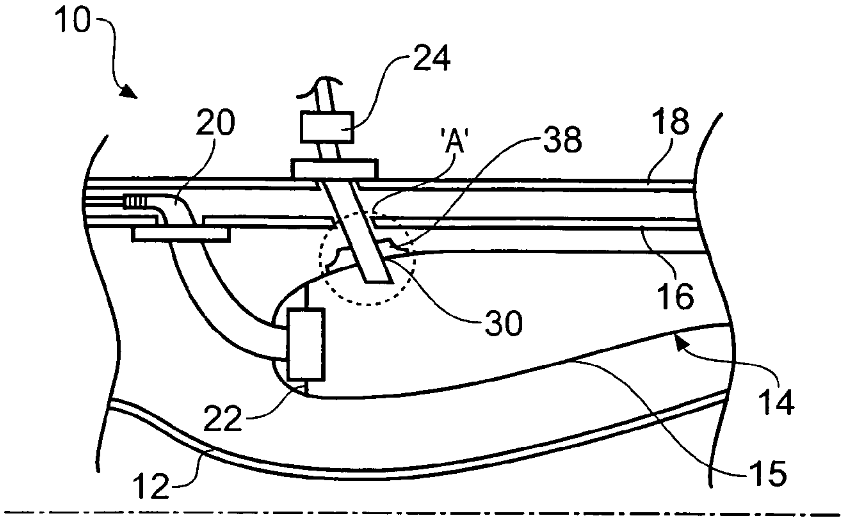
FIG. 1 shows a combustion section of a gas turbine engine comprising an arrangement according to the present invention at location "A"

FIG. 1 shows a section of a gas turbine engine, the general structure of which is well known and will not be described in detail since it is not central to the understanding of the invention. The section shown in FIG. 1 is a combustion section 10. The combustion section 10 comprises an annular combustor inner casing 12 surrounded by an annular combustor 14, which is in turn surrounded by an annular combustor outer casing 16. An engine casing 18 is disposed around the outer casing 16. A fuel injector 20 is mounted on the outer casing 16 and is positioned at an inlet 22 at the head of the combustor 14. A spark ignition device 24 is mounted on the engine casing 18, and passes through the engine casing 18 and outer casing 16 and an opening 30 formed in a wall 15 of the combustor 14. A sealing arrangement 38 according to the present invention is provided on the external wall 15 of the combustor 14 about the opening 30.

Figure 4:
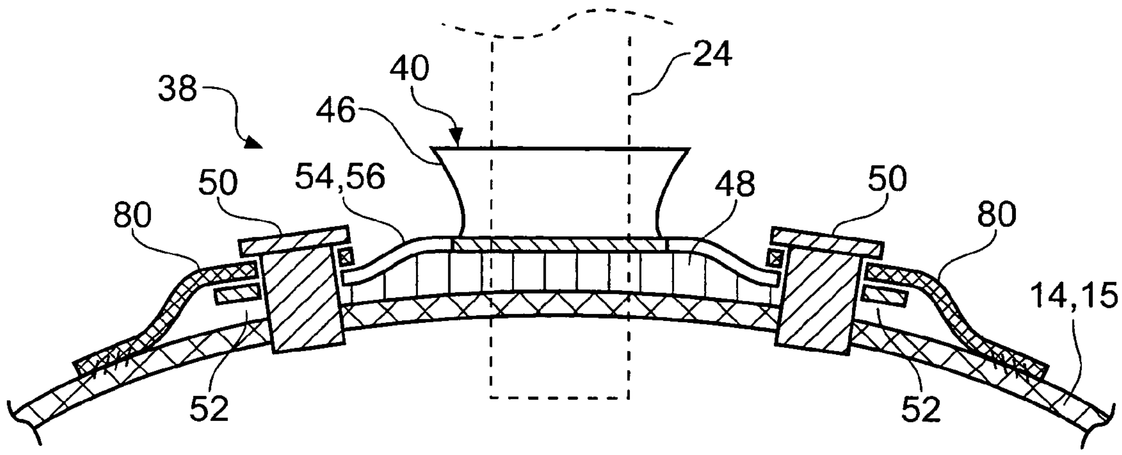
FIG. 4 shows a cross-sectional view of the arrangement as indicated by section B-B in FIG. 2.
Figure 2:
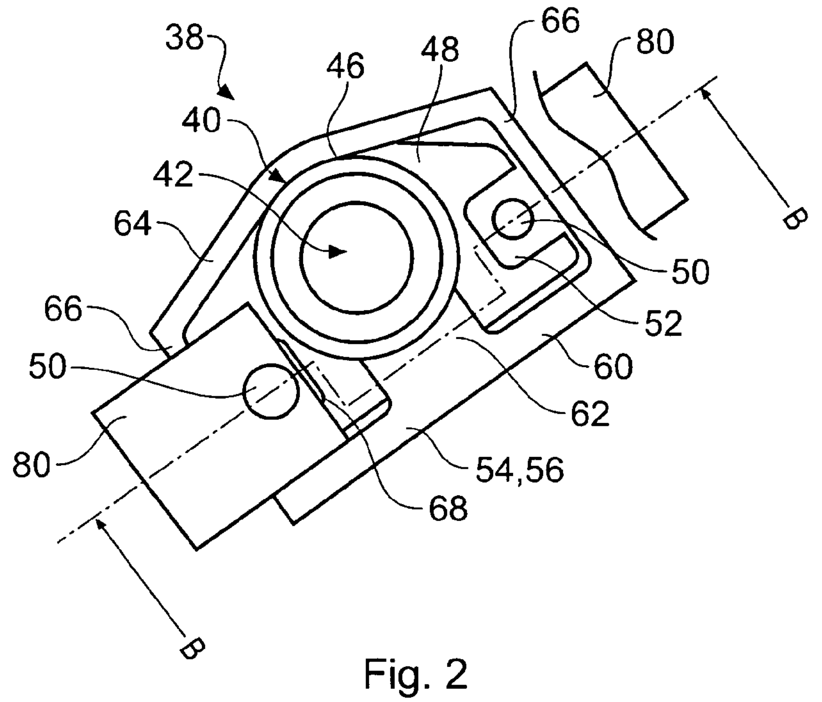
FIG. 2 shows a plan view of an arrangement according to the present invention identified at location "A" in FIG. 1.
Figure 3:
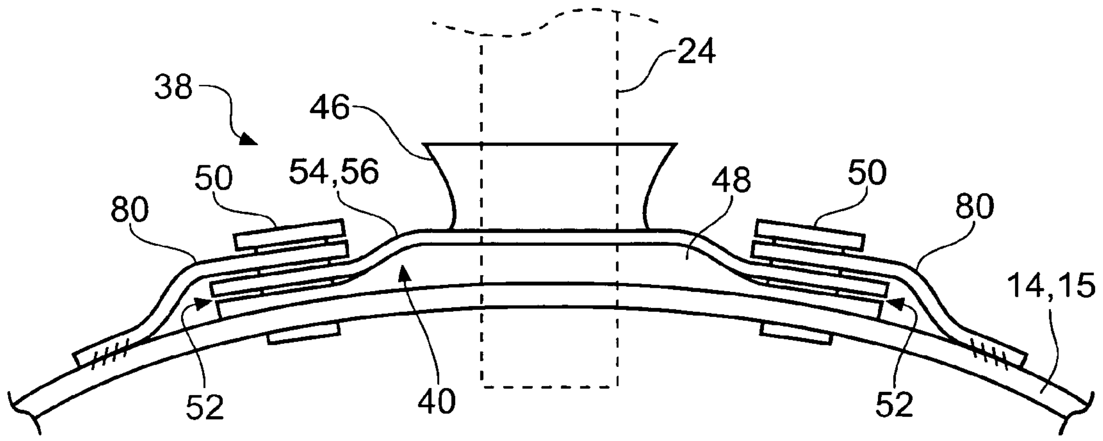
FIG. 3 shows a side view of the arrangement as shown in FIG. 2.

With reference to FIG. 2, in which is presented a plan view of the sealing arrangement 38, FIG. 3, which shows a side view of the present invention, and FIG. 4, which shows a cross-section as viewed from A-A in FIG. 2, the sealing arrangement 38 comprises a sealing member 40 which is provided with a through passage 42. The sealing member 40 is mounted on the combustor wall 15 adjacent to the opening 30 in the combustor wall 15 such that the passage 42 is substantially co-axial with the opening 30.

The sealing member 40 comprises a frustoconical grommet portion 46, for receiving the spark ignition device 24. The grommet is provided with a flange 48 which is shaped to conform substantially to the shape of region of the combustor wall 15 with which comes into contact.

The sealing member 40 is mounted on the combustor wall 15 with pins 50 which pass through holes/mounting apertures 52 in the flange 48 into the combustor wall 15. In the embodiment shown the mounting apertures 52 are provided as cut outs (that is to say the aperture is open on one side) but could equally be provided as an enclosed hole. Biasing means 54 in the form of a resilient member 56 extends across the top (ie the radially outer edge) of the flange 48, and engages with the sealing member 40. As can be seen most clearly from FIG. 2, the resilient member 56 comprises a first portion 60 which runs along one side of the sealing member 40 and has a lobe 62 which extends from the first portion 60 towards the grommet portion 46 and engages with the radially outer surface of the flange 48. The resilient member 56 also has a second portion 64 which extends around a part of the outer circumference of the grommet portion 46 whilst engaging the flange 48. The first and second portions 60,64 are disposed on opposite sides of the grommet 46 and are joined by cross members 66.

Brackets 80 are welded to the combustor wall at locations adjacent to the sealing member 40 and extend over the flange 48 and resilient member 56. In FIG. 2 only one of the brackets 80 is shown in its entirety, the other being "cutaway" such that details of the resilient member 56 and flange 48 can be seen. The pins 50 are passed through holes/mounting apertures 82 in the brackets 80, the flange cut outs 52, and into the combustor wall 15. The resilient member 56 is trapped between the bracket 80 and the flange 48, thereby preventing the resilient member 56 from coming loose. The flange cut outs 52 are sized such that there is a clearance between the pins 50 and the flange 52, hence allowing a degree of movement relative to the combustor wall 15. The holes 68 in the bracket 80 and the holes in the combustor wall for receiving the pins 50 have an interference fit with the pins 50. Additionally the pins may be welded to the bracket 80.

The igniter 24 (not shown in FIG. 2 for clarity but shown as a dotted line in FIGS. 3 and 4) is received by the grommet 46 and extends through the passage 42 in the sealing member 40. Misalignment between the mounting of the igniter 24 and the positioning of the sealing member 40 is accommodated by the relative movement possible between the sealing member 40 and the combustor wall 15 because of the difference in size of the cut outs 52 and the pins 50. The diameter of the opening 30 in the combustor wall 15 is larger than the diameter of the passage 42, its size being determined by the expected misalignment between the igniter mount on the engine casing 18 and the opening 30.

In operation high pressure air is delivered from a compressor upstream of the combustor 14 (i.e. to the left in FIG. 2) and passes along the passage defined between the combustor 14 and the combustor inner casing 12, and along the passage defined between the combustor 14 and the combustor outer casing 16. The grommet 46 prevents an excess of air passing through the opening 30 and around the end of the igniter 24, thereby preventing disturbance of a spark/flame kernel formed by the ignition device. Vibrations caused during operation of the engine will excite the grommet 46, but the vibrations are damped by the resilient member 56, which urges the sealing member 40 towards the combustor wall 15.

The mounting of the sealing member 40 is such that the sealing member 40 and resilient member 50 are moveable relative to the combustor wall 15 in a plane parallel to the surface of the wall 15 and normal to the surface of the wall 15; but vibrations in both planes will be damped by the resilient member 56.

An advantage of the present invention is that because the sealing member 40 is damped its motion relative to the igniter will be minimal, and hence the sealing member 40 will not fret on the igniter 24 and wear it away. Hence the life of the igniter 24 is extended and the reliability of the engine ignition system is increased.

Another advantage of the present invention is that since the member 40 is continuously preloaded, it will retain its position when the igniter 24 is removed for inspection or replacement. That is to say it will not move within the clearance of its mountings under gravity. This allows for the old igniter to be refitted, or a new igniter to be fitted, with the grommet 46 pre-aligned and hence reduces the likelihood of incorrect seating of the igniter 24 on or within the sealing member 40.

The resilient member 56 is provided with shape which conforms, to some extent, with the shape of the flange 48. That is to say it is kinked in a particular way to fit over the flange 48. This prevents the resilient member from being fitted incorrectly, for example upside down. The resilient member 56 is shaped such that the deflection required to fit the member 56 in place will provide a desired pre-load on the grommet.

The resilient member 56 in this embodiment is provided as a sheet metal spring, but may be provided in any appropriate form which achieves the same technical effect of forcing the grommet into contact with the outer surface of the combustor wall 15.

The invention claimed is:

1. An arrangement for sealing an opening formed in a wall of a combustor for receiving a member, the arrangement comprising:

a sealing member with a passage, whereby the sealing member is moveably mounted on the wall adjacent to the opening such that the sealing member passage is substantially co-axial with the opening in the wall, and biasing means for biasing the sealing member towards the wall, the biasing means being on an outside face of the wall, wherein the sealing member includes a flange portion and a grommet portion, the flange portion extending outwards from a base of the grommet portion and the sealing member.

2. An arrangement as claimed in claim 1 wherein the biasing means comprises at least one resilient member.

3. An arrangement as claimed in claim 1 wherein the sealing member comprises the flange portion which is engaged by the biasing means.

4. An arrangement as claimed in claim 1 wherein the biasing means extends across and/or around at least part of the sealing member.

5. An arrangement as claimed in claim 1 wherein the biasing means substantially conforms to at least part of the shape of the sealing member.

6. An arrangement as claimed in claim 1 wherein the sealing member is mounted on the wall by at least one pin which extends through a corresponding mounting aperture in the sealing member, the mounting aperture having a diameter larger than the diameter of the at least one pin such that the sealing member is moveable relative to the wall.

7. An arrangement as claimed in claim 1 further comprises at least one bracket attached to the wall which extends over at least part of the biasing means, thereby trapping the biasing means between the at least one bracket and the flange.

8. An arrangement as claimed in claim 7 wherein the at least one pin also extends through and/or is held in place by the at least one bracket.

9. An arrangement as claimed in claim 6 wherein the sealing member and biasing means are moveable relative to the wall in a plane parallel to the surface of the wall.

10. An arrangement as claimed in claim 6 wherein the sealing member and biasing means are moveable relative to the wall in a plane normal to the surface of the wall.

11. An arrangement as claimed in claim 1 wherein the biasing means is a sheet metal spring.

12. An arrangement as claimed in claim 1 wherein the arrangement comprises part of a gas turbine engine.

13. An arrangement as claimed in claim 12 wherein the arrangement comprises part of a gas turbine engine combustion system.

* * * * *